Aug. 8, 1939.  K. E. BEMIS  2,168,388
BARBECUE FURNACE
Filed Dec. 24, 1937
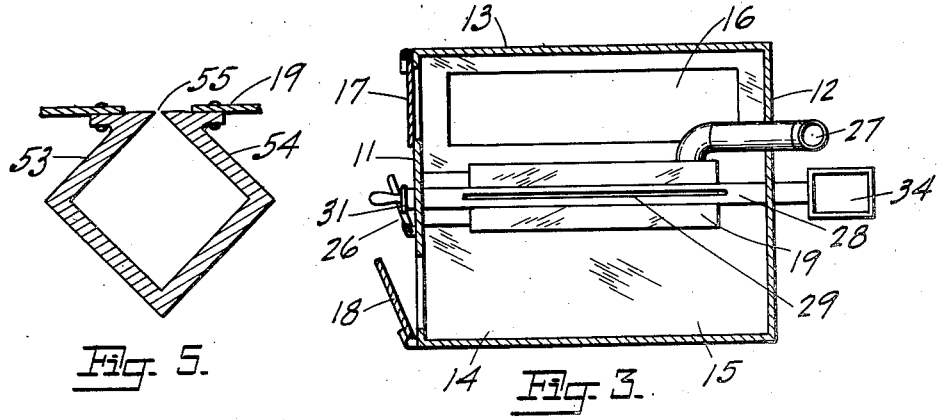
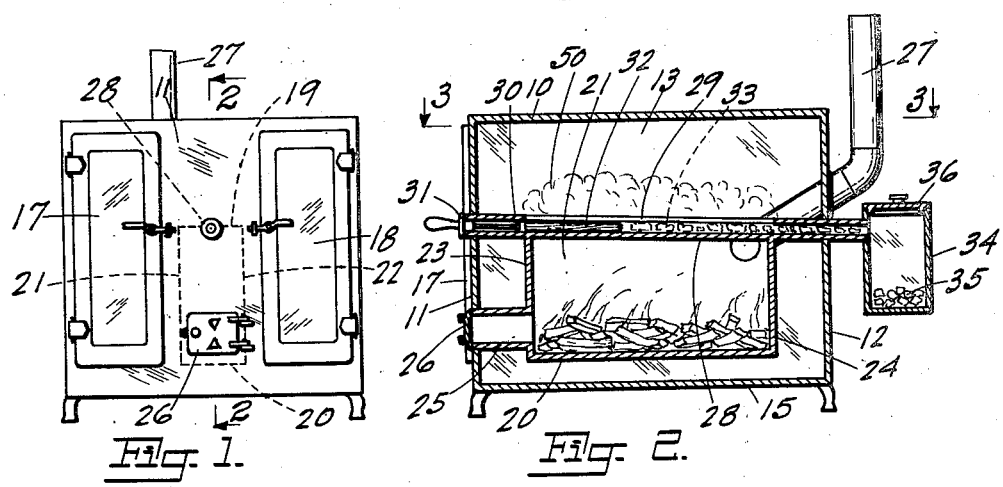
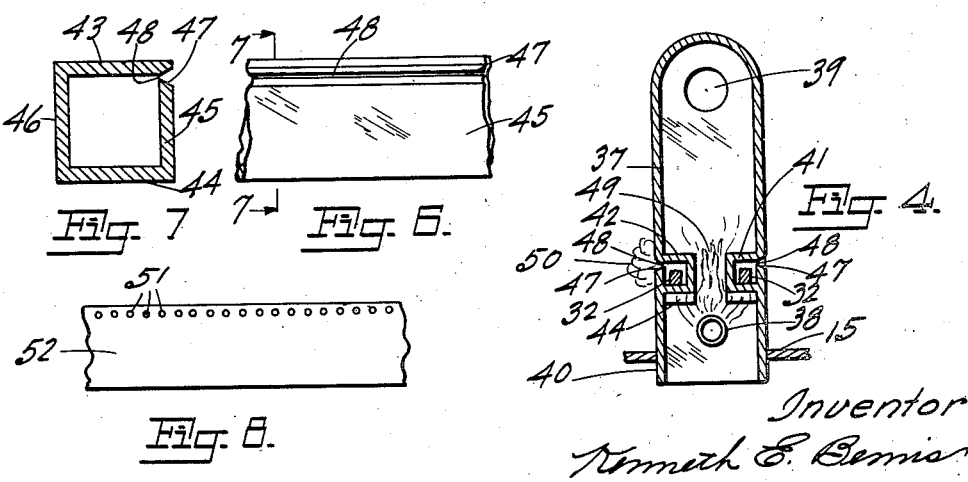
Inventor
Kenneth E. Bemis
By Philip A. Friedell
Attorney Patented Aug. 8, 1939

2,168,388

UNITED STATES PATENT OFFICE 2,168,388

BARBECUE FURNACE

Kenneth E. Bemis, Oakland, Calif.

Application December 24, 1937, Serial No. 181,517

7 Claims. (Cl. 99—259)

This invention, a barbecue furnace, consists of an oven surrounding a fire box and having no communication with the interior thereof; the fire box being spaced all around from the walls of the oven, and having a retort exposed to the fire in the fire box and sealed therefrom and having restricted communication with the interior of the oven, whereby special wood, such as hickory, is used only for the purpose of supplying the necessary smoke for carrying out the barbecue process.

The usual barbecue process involves subjection of the meat to the direct action of fire and the smoke and gases produced by the fire, hickory being the only suitable wood for obtaining the most delectable results; and in this usual process, a great deal of hickory is required for both cooking and smoking, and as hickory is a comparatively expensive wood, especially in districts where it is not a native growth, this usual process is very unecomonical and wasteful.

Meat can only absorb a certain amount of smoke and requires a predetermined amount of heat to cook it, and which heat may be directly or indirectly applied, therefore, when hickory smoke is supplied to the meat in just the proper amount, and the cooking of the meat is accomplished by less expensive fuel, especially when burned in a stove which is located within the oven and not in communication therewith so that the cooking is accomplished by heat conducted through the walls of the stove, highest efficiency is attained in both, smoke, and heat producing mediums, resulting in finest flavor in the barbecued meat; and to provide such means is the prime object of this invention.

Other objects of the invention are to provide a retort which is heated through the medium of the same fire which is used to heat the oven; to form an escape for smoke from the retort in the form of a narrow slit extending throughout the length of the active portion of the retort, and of such restricted area that combustion cannot occur in the retort; to provide a covered receiver for one end of the retort to receive the residue from the distilled hickory, such as charcoal and creosote; to slope the retort toward the receiver to receive fluid residues; and to form the slit in the retort with sharp edges to decrease or prevent incrustation and to provide for easy cleaning of the slit.

Other objects and advantages of the invention will become apparent as the following description is read on the drawing forming a part of this specification, and in which similar reference characters are used to designate similar parts throughout the several views, of which;

Fig. 1 is a front elevation of the invention, shown adapted for coal or wood burning.

Fig. 2 is a vertical section taken on line 2—2 of Fig. 1.

Fig. 3 is a section taken on line 3—3 of Fig. 2.

Fig. 4 is a modified form of fire box and retort system, adapted for burning gaseous fuel.

Fig. 5 is an enlarged cross-sectional view of a modified form of retort.

Fig. 6 is an enlarged fragmentary side elevation of another type of retort.

Fig. 7 is a section taken on line 7—7 of Fig. 6.

Fig. 8 is a fragmentary side elevation of another modification of the retort showing a series of small apertures functioning as the smoke escape.

The oven consists of either a complete enclosure, or one which is open at the bottom only and which may be formed of brick, clay, or other suitable material, such as metal illustrated, and may be of any desired form and size, such as the rectangular form shown in Figs. 1, 2 and 3, in which the oven has a top 10, front, back and side walls, respectively 11, 12, 13 and 14, and the bottom wall 15 is preferably included but a part thereof may be omitted, as indicated at 16, if necessary or desired, there being actually little difference in results if omitted.

The oven is provided with suitable doors 17 and 18, or the meat to be barbecued, or foods to be baked, are lifted upwardly through an opening, as 16, formed in the bottom of the oven.

The fire box or stove is mounted within the oven and has its top, bottom, side, and end walls, respectively 19 to 24, all spaced from the respective walls of the oven to utilize all heat transmitted through the walls of the fire box.

The lower end of the fire box may be extended downwardly beyond the bottom of the oven, similar to the construction shown in Fig. 4, and a grate, (not shown) may then replace the bottom wall 20, this being an alternative form of construction.

A stoker and draft vent 25 connects with the fire box and extends through the front wall 11 of the oven, and is provided with a door 26, suitably vented.

The fire pit is provided with a flue 27 to carry away the gaseous products of combustion and prevent their escape into the oven.

The retort 28 shown in Figs. 1, 2 and 3 is cylindrical in form and has a slit 29 formed throughout the length of the top wall within the oven, so as to supply smoke uniformly through the oven, and the top wall 19 of the fire box is secured to the top wall of the retort and has an opening exposing the slit in the retort.

This retort is provided at its front end with a combined plunger 30 and plug 31 for pushing small sticks 32 of hickory into the retort and coincidently urging the charcoal 33 into the receptacle 34 as indicated at 35, this receptacle 34 having a removable cover 36 or other covered passage for removing the charcoal and other residue from the receiver. The plug 31 forms a seal for one end of the retort and the receptacle forms a seal for the other end, preventing admission of air to avoid combustion of the hickory in the retort.

The retorts illustrated are substantially uniform in cross-section throughout their length, and are inclined downwardly from the front end to the rear end to cause all fluids distilled to drain into the receptacle 34, and prevent their draining from the front end.

In Fig. 4 is shown a modification of the stove or heater, and which consists of a fire box 37 having a gas burner 38 mounted adjacent the bottom, and a flue 39 connecting adjacent the top. The lower end 40 of the fire box is shown open, but may be either open or closed, and extends below the bottom wall 15 of the oven, and conforms in principle with the explanation given relative to the bottom 20 of Fig. 2.

Mounted in cooperative relation to the burner 38 are two retorts 41 and 42 which are of the form shown in Figs. 6 and 7, having top, bottom, front and back walls respectively 43 to 46, and a V-shaped groove 47 just cuts through the wall 45 to form a very narrow slit 48 throughout its length.

The flame 49 from the burner 38 acts directly on the walls 44—46 of the retorts, subjecting the hickory 32 to destructive distillation, the liquids flowing down the inclined wall to the receiver 34 and the smoke and gases 50 escaping uniformly throughout the length of the slit 48, or 29, into the oven, the sharp edges of the slit making the slit flue-less and avoiding blocking and encrustation which so readily occurs in a walled passage, as in holes 51 formed in the front wall 52 of the modification shown in Fig. 8.

This slit, or the holes 51 must be maintained within certain limits to prevent entrance of air in sufficient amount to induce any appreciable combustion, and the most satisfactory results are obtained where the width of the slot is less than one-sixteenth of an inch.

Another modification of the retort is shown in Fig. 5 in which one corner of two converging walls 53 and 54, is removed as shown, as by milling, and to a depth to just form the slit 55.

This type of retort is preferably used in the top of a fire box, such as that shown in Fig. 2, since the slot should always be located in the upper portion of the retort to minimize air entry.

With the arrangements described, any kind of fuel, such as wood, coal, liquid or gaseous fuels, or electricity can be used to heat the oven and carry on the cooking process, and the same source of heat which heats the oven also heats the retort and distills the hickory to provide the smoke.

The retort can be made very small in cross-section, a suitable size having an internal diameter of less than two inches, since with this arrangement, a stick of hickory about an inch square and a foot long, and weighing but a few ounces, will supply sufficient smoke, or better and greater flavoring value, due to absence of combustion, for efficiently barbecuing upwards of twenty-five pounds of meat, while with the open pit method possibly upward of twenty-five pounds of hickory would be required for the same amount of meat, and a great deal of the flavoring elements of the smoke is destroyed by combustion in the open pit.

With this arrangement, the volume of smoke can be controlled by the volume of the stick of hickory used, and the heat can be controlled at will, thus producing ideal conditions producing the highest efficiency and finest flavored products, and obviating all wasteful use of hickory.

It will be understood that this furnace can also be used for various roasting and baking operations merely by forcing all of the wood and residues out of the retort into the receiver, and that variations in construction and arrangement of parts, which variations are consistent with the appended claims, may be resorted to without detracting from the spirit or scope of the invention, or sacrificing any of the advantages thereof.

I claim:

1. In a barbecue furnace, a fire box having walls and an oven encompassing said fire box and having walls spaced from the walls of said fire box; heating means within said fire box; and a retort having a restricted passage for escape of smoke while being of sufficiently small area preventing ingress of air in amount sufficient to support combustion, and communicating with said oven, said retort being otherwise sealed against escape of smoke or ingress of air and being exposed to the direct heat of said heating means.

2. In a barbecue furnace, a fire box having walls and an oven encompassing said fire box; heating means within said fire box; and a retort communicating with said oven and exposed to the direct heat of said heating means; said retort having a slit formed with sharp divergent edges and extending throughout the length of the retort; a receiver and removable closure means therefor and in communication with one end of said retort and forming a seal against admittance of air to said retort, and coincidently functioning as a receiver for residue from said retort.

3. A barbecuing furnace comprising, an oven; a furnace within said oven and heating means within said furnace; a retort within said furnace and having a restricted smoke-escape passage communicating with said oven; said retort being heated by said heating means and delivering products of distillation directly into said oven through said passage, the area of said passage being restricted to permit escape of smoke and prevent ingress of air into the retort in sufficient amount to support combustion.

4. A barbecueing furnace comprising; a furnace; heating means within said furnace; a retort in said furnace and heated directly by said heating means; and an oven surrounding said furnace and having no communication with the interior thereof and heated entirely by heat transmitted through the walls of the furnace; said retort having a single passage of small area in communication with the interior of said oven and restricted to permit escape of smoke and gaseous products of distillation of wood to said oven while preventing ingress of air to the retort in sufficient amount to support combustion; said retort being otherwise sealed against ingress or escape of gases.

5. A barbecuing furnace comprising; a furnace; heating means within said furnace; a retort in said furnace and heated directly by said heating means; and an oven surrounding said furnace and having no communication with the interior thereof and heated entirely by heat transmitted through the walls of said furnace; said retort having direct communication with the interior of said oven for delivering smoke and gaseous products of distillation of wood thereto; said retort having a V-shaped groove formed inwardly through one wall thereof and throughout its length and passing through the wall just sufficiently to form a very narrow slit with sharp edges, and forming the means of communication with said oven; a receiver and closure means therefor for one end of said retort and removable closure means for the other end; said retort being inclined downwardly to said receiver to facilitate draining to said receiver.

6. A barbecuing furnace comprising a completely enclosed furnace; heating means within said furnace; an oven surrounding said furnace and having its walls spaced from the walls of said furnace; a retort mounted on one wall of said furnace and interiorly thereof and exposed directly to said heating means and having a smoke passage restrictedly communicating with the interior of said oven to permit escape of smoke and gaseous products of destructive distillation to said oven said passage being of sufficiently small area preventing ingress of air to support combustion while said retort is delivering smoke, said retort being otherwise sealed.

7. A barbecuing furnace comprising a completely enclosed furnace; heating means within said furnace; an oven surrounding said furnace and having its walls spaced from the walls of said furnace; a retort mounted on one wall of said furnace and interiorly thereof and exposed directly to said heating means and restrictedly communicating with the interior of said oven for delivering smoke and gaseous products of distillation to said oven; a receiver and closure means therefor mounted at one end of said retort, and removable closure means for the other end, said retort being inclined downwardly to said receiver to facilitate drainage and disposal of solid residues of distillation; said retort having a sharp-edged, narrow slit formed throughout the length of one wall and forming the restricted means of communication with said oven.

KENNETH E. BEMIS.